W. MOSSMAN.
WAGON BRAKE LEVER.
APPLICATION FILED NOV. 18, 1916.
1,241,419.
Patented Sept. 25, 1917.
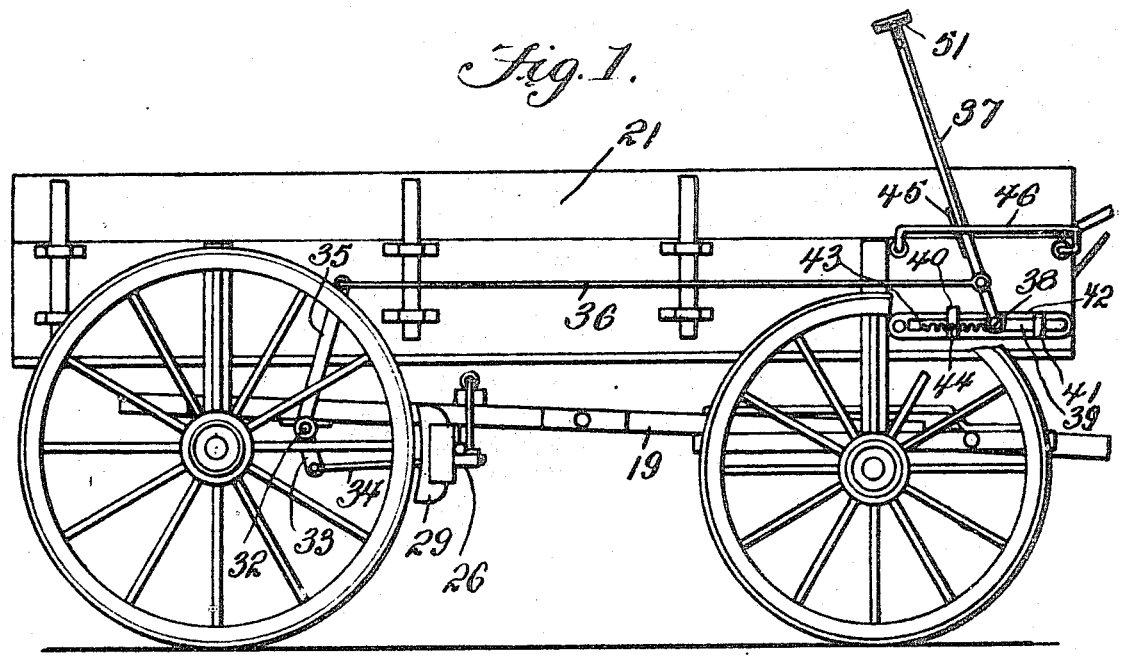
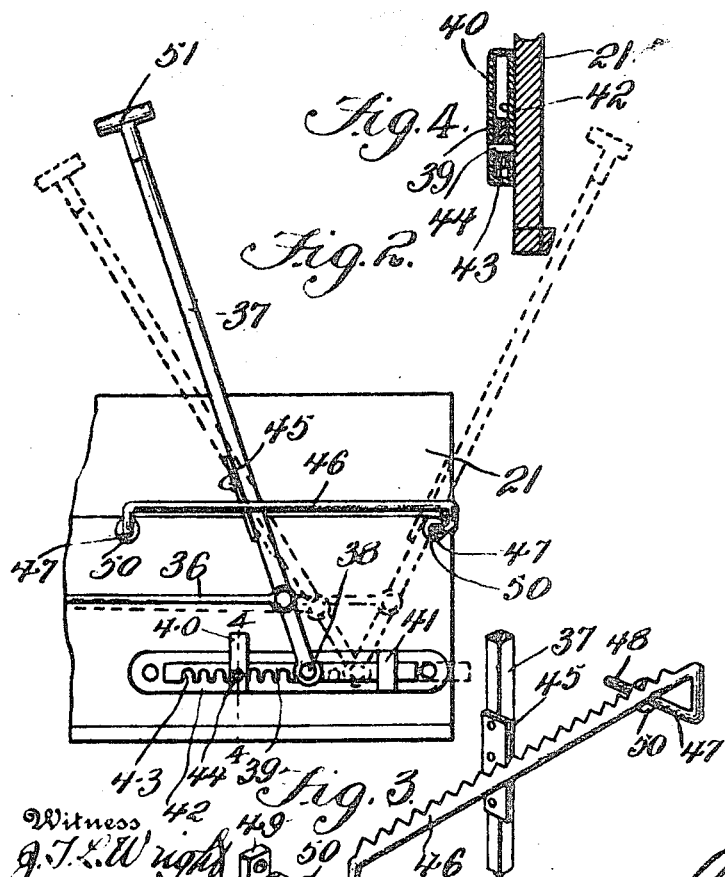
Inventor
W. Mossman
By Victor J. Evans
Attorney
Witness
J. T. L. Wright
W. Bagger

UNITED STATES PATENT OFFICE.

WILBUR MOSSMAN, OF OREANA, IDAHO.

WAGON-BRAKE LEVER.

1,241,419.  Specification of Letters Patent.  Patented Sept. 25, 1917.

Application filed November 18, 1916. Serial No. 132,174.

*To all whom it may concern:*

Be it known that I, WILBUR MOSSMAN, a citizen of the United States, residing at Oreana, in the county of Owyhee and State of Idaho, have invented new and useful Improvements in Wagon-Brake Levers, of which the following is a specification.

This invention relates to wagon brake levers and it has particular reference to brake levers for wagons such as lumber wagons and the like which are subjected to rough use.

One object of the invention is to produce a brake lever of simple and improved construction, the fulcrum of which may be shifted so as to enable the brake lever to be most advantageously used.

A further object of the invention is to simplify and improve the detailed construction and operation of the brake lever and related parts.

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention, it being, however, understood that no limitation is necessarily made to the precise structural details therein exhibited, but that changes, alterations and modifications within the scope of the claim may be resorted to when desired.

In the drawing,—

Figure 1 is a side elevation of a wagon equipped with the improved brake.

Fig. 2 is a detail side elevation, enlarged, of the forward part of the wagon body showing the brake lever and related parts.

Fig. 3 is a perspective detail view showing a portion of the brake lever and the ratchet bar engaged thereby.

Fig. 4 is a sectional detail view taken on the line 4—4 in Fig. 2.

Corresponding parts in the several figures are denoted by like characters of reference.

19 designates a running gear and 21 the box or body of an ordinary wagon to which the invention has been applied. 26 is a brake beam which is swingingly supported in the usual manner, said brake beam carrying the shoes 29. The brake beam is connected by a link or rod 34 with an arm 33 extending downwardly from a rock shaft 32, said rock shaft having also an upwardly extending arm 35 which is connected by a link 36 with the brake lever 37.

The lower end of the brake lever is fulcrumed at 38 on a slide 39 which is mounted in keepers 40, 41 on a plate 42 which is bolted on the side of the wagon box near the front end thereof. The keepers 40, 41 are, respectively, of such dimensions that the forward end of the slide 39 may rock in the keeper 41, while the rearward end of the slide is free to move in the keeper 40 to such an extent as to disengage the notches 43 formed at the lower edge of the slide from a pin 44 which connects the keeper 40 with the base plate 42, thereby permitting the slide to be moved longitudinally, as will be seen by reference to the dotted lines in Fig. 2. After the slide has been properly adjusted the rearward end thereof is permitted to gravitate downwardly until one of the notches 43 engages the pin 44, thereby securing the slide against longitudinal movement. The lever 37 is provided with a locking plate 45 adapted to engage a ratchet bar 46 supported on the wagon box, said ratchet bar being provided with brackets 47 having threaded ends 48 adapted to engage the side of the wagon box and to be secured by means of nuts 49 in the customary manner, said brackets being also provided with collars 50 to limit their movement when the nuts are tightened. The brake lever is provided at its upper end with a T-handle 51 whereby it may be conveniently and effectively actuated.

It will be seen that by moving the slide 39 in a forward direction the connecting rod 36 will be likewise drawn in a forward direction, assuming the hand lever to rock about that portion of the locking plate 45 which engages the ratchet bar 46, thereby rocking the shaft 32 and moving the brake shoes in the direction of the wheels to such an extent that the said brake shoes may be forcibly set by a comparatively limited movement of the brake lever, and enabling great force to be exerted for setting the brake. This construction also enables wear on the brake shoes to be compensated for.

Having thus described the invention, what is claimed as new, is:—

A brake lever, a notched slide on which the lever is fulcrumed, a base plate having keepers in which said slide is supported, one of said keepers being of dimensions to permit swinging movement of one end of the slide, and a pin connecting said keeper with the base plate for engagement with the notched slide.

In testimony whereof I affix my signature.

WILBUR MOSSMAN.